United States Patent
Nordbruch

(10) Patent No.: US 9,457,803 B2
(45) Date of Patent: Oct. 4, 2016

(54) METHOD FOR ACTIVATING A DRIVER ASSISTANCE SYSTEM

(75) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/348,004

(22) PCT Filed: Aug. 6, 2012

(86) PCT No.: PCT/EP2012/065343
§ 371 (c)(1),
(2), (4) Date: Jul. 14, 2014

(87) PCT Pub. No.: WO2013/050189
PCT Pub. Date: Apr. 11, 2013

(65) Prior Publication Data
US 2014/0358327 A1    Dec. 4, 2014

(30) Foreign Application Priority Data

Oct. 4, 2011  (DE) .................. 10 2011 083 944

(51) Int. Cl.
*B60W 30/00*    (2006.01)
*B60W 50/08*    (2012.01)
*B60W 50/00*    (2006.01)

(52) U.S. Cl.
CPC ............ *B60W 30/00* (2013.01); *B60W 50/082* (2013.01); *B60W 50/087* (2013.01); *B60W 2050/0089* (2013.01); *B60W 2540/04* (2013.01); *B60W 2540/24* (2013.01); *B60W 2540/26* (2013.01); *B60W 2540/28* (2013.01); *B60W 2540/30* (2013.01)

(58) Field of Classification Search
CPC .......... B60W 50/082; B60W 50/087; B60W 2050/0089; B60W 2540/04; B60W 30/00; B60W 2540/26; B60W 2540/28; B60W 2540/30; B60W 2540/24
See application file for complete search history.

(56) References Cited

U.S. PATENT DOCUMENTS

| | | | |
|---|---|---|---|
| 2004/0124697 A1* | 7/2004 | MacGregor | B60T 17/18 303/89 |
| 2005/0030184 A1 | 2/2005 | Victor | |
| 2006/0015219 A1* | 1/2006 | Kynast | G01C 21/26 701/1 |
| 2006/0052917 A1* | 3/2006 | Schwarzhaupt | B60T 7/12 701/31.4 |
| 2010/0063697 A1 | 3/2010 | Lindgren et al. | |

FOREIGN PATENT DOCUMENTS

| | | |
|---|---|---|
| CN | 1802273 A | 7/2006 |
| CN | 101547827 A | 9/2009 |

(Continued)

OTHER PUBLICATIONS

International Search Report for PCT/EP2012/065343, dated Nov. 20, 2012.

*Primary Examiner* — Yuen Wong
(74) *Attorney, Agent, or Firm* — Norton Rose Fulbright US LLP

(57) ABSTRACT

In a method for activating a driver assistance system in a vehicle, a check is performed after an activating request for a driver assistance system from a driver as to whether the driver of the vehicle is suitable for utilizing the requested driver assistance system, and the activation of the requested driver assistance system is carried out depending on the suitability of the driver.

14 Claims, 3 Drawing Sheets

(56) References Cited

FOREIGN PATENT DOCUMENTS

| DE | 100 56 756 | 5/2002 |
| DE | 10 2009 028 637 | 2/2011 |
| EP | 2 293 255 | 3/2011 |
| WO | WO 2007/090896 | 8/2007 |

* cited by examiner

METHOD FOR ACTIVATING A DRIVER ASSISTANCE SYSTEM

BACKGROUND OF THE INVENTION

1. Field of the Invention

The present invention relates to a method for activating a driver assistance, a driver assistance system and a computer program product.

2. Description of the Related Art

Various methods for activating a driver assistance system are known from the related art. By a driver assistance system one may understand, for example, an automatic distance regulation, an automatic speed regulation or an automatic tracking system.

Published German patent application document DE 10 2009 028 637 A1 describes a method and a device for a user-defined setting of a driver information system. In a method described, for the driver-defined setting of a driver information system, data from past behavior of the driver, particularly the driving behavior or entered data are stored, and drawn upon for making a decision, a driver-defined decision matrix being set up which is adaptable as a function of operating data, and is drawn upon for making a preliminary decision using the driver information system. In this context, user data are drawn upon from other areas for adjusting the user-defined decision matrix.

BRIEF SUMMARY OF THE INVENTION

The object of the present invention is to provide an improved method for activating a driver assistance system.

One advantage of the method described is that a driver assistance system is provided individually for the driver, at least partially or completely, in a stipulated scope. In this way, increased safety in the utilization of driver assistance systems is made possible. This advantage is achieved in that the suitability of the driver for utilizing the driver assistance system is checked and taken into account in the decision as to whether the driver assistance system is to be activated. It is thus possible to achieve a safe utilization of the driver assistance system in accordance with the suitability of the driver.

In one refinement of the present invention, an operating behavior of the vehicle by the driver is ascertained. The recorded operating behavior is used to assess the suitability of the driver for the utilization of the requested driver assistance system. Consequently, it may be ensured that a driver who, for instance, did not use a driver assistance system properly, is not able to use the driver assistance system in the future or only after renewed input. Thus, experience values in the utilization of the driver assistance system are used, in order to release the driver assistance system to the driver only conditionally or not at all.

In a further specific embodiment, the requested driver assistance system is activated if the checking discloses that the driver is suitable, the activation of the requested driver assistance system being prevented if the driver is judged as unsuitable. In this specific embodiment, the driver himself is not enabled to activate a driver assistance system for which the driver is judged to be unsuitable. This is therefore able to avoid a dangerous use of the driver assistance system.

In one further specific embodiment, the driver is able to activate a requested driver assistance system by an appropriate input, even though he has been judged as unsuitable. Thus, the driver is enabled to activate the driver assistance system, in spite of being judged unsuitable. Consequently, a driver who behaved unsuitably in the past is able to utilize the driver assistance system, using a correspondingly heightened attentiveness or a correspondingly improved behavior, and be judged as being suitable in the future. This makes possible an increased flexibility of the described method.

In one further specific embodiment, a stored value is provided for the checking of the suitability of the driver, which is preferably able to be stored individually for a plurality of drivers. In this way, a simple comparison of the recorded operating behavior of the driver to the stored value is sufficient for judging the suitability of the driver.

In another specific embodiment, the operating behavior of the driver is recorded while a driver assistance system of the vehicle, especially the requested driver assistance system, is active. Consequently, it is possible to ascertain the operating behavior of the driver not only in general, but with reference to driver assistance systems, especially with reference to a stipulated driver assistance system. This makes possible a meaningful statement on the operating behavior.

In yet another specific embodiment, a plurality of operating behaviors of the driver may be recorded. For example, if different active driver assistance systems and/or different driving situations are present, a plurality of values for the operating behavior of the driver may be ascertained. For the suitability, either the value may be used which was ascertained during the requested driver assistance system, or an average value is ascertained for the operating behavior of the driver, and used for comparison to the stored value.

In still another specific embodiment, for assessing the suitability of the driver, a value is used for the suitability of the driver which was ascertained during an active status of the requested driver assistance system.

In one other specific embodiment, in addition, a present driving situation and a corresponding value for the suitability of the driver for the driving situation is taken into account for judging the suitability.

DETAILED DESCRIPTION OF THE INVENTION

Figure 1:
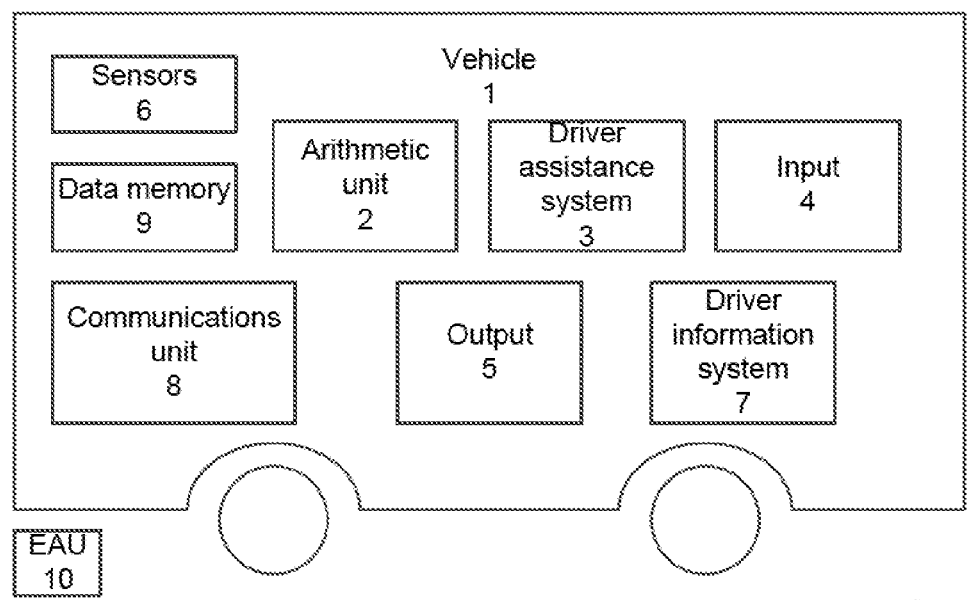
FIG. 1 shows a schematic representation of a braking system having a driver assistance system.

In a schematic representation, FIG. 1 shows a vehicle 1, which has an arithmetic unit 2, which is connected to a driver assistance system 3, an input 4 and an output 5. Arithmetic unit 2 is also connected to sensors 6 which record, for example, parameters of the vehicle, environmental data of the vehicle and/or data on the behavior of the driver, and transmit these to the arithmetic unit. Arithmetic unit 2 is developed as a control unit, for instance, which controls the functions required for the vehicle. As a function of the selected specific embodiment, arithmetic unit 2 may additionally be developed as a control unit of the vehicle. The driver of the vehicle may give input commands to arithmetic unit 2 and/or the control unit via an input 4.

Input 4 represents, for example, an accelerator, a switch or a touch screen.

In addition, the driver is able to activate a driver assistance system via the operation of input 4. As the driver assistance system, for example, a tracking system, an obstacle avoidance system, an emergency braking system, an automatic ranging system and an automatic speed regulation may be used. In addition, the vehicle may have a driver information system 7 which is developed as a navigation system and/or as an information system, for example, which retrieves data and information via a wireless connection from a central data service, such as the Internet, and passes them on to the driver or takes them into account when executing a driver assistance system.

Furthermore, the driver assistance system may also include an autonomous driving system which relieves the driver, at least temporarily, of the responsibility for guiding the vehicle. Sensors 6 may be developed as simple sensors, for instance, for recording steering motions, for recording speed and/or for recording accelerations. Sensors 6 may also be developed in the form of more complex sensor systems which, for example, include a driver fatigue system or a driver attentiveness system. Inside cameras that watch the driver may be provided, for example, as the basis of these systems. In addition, a driver recognition system may be provided as sensor 6, which recognizes which driver is sitting in the driver's seat. For this, too, interior cameras are used, for example, having visual evaluation, such as of the head or the eyes. In addition, coded cryptographic systems may be used which are individually assigned to a driver. Moreover, the driving behavior, such as braking, stepping on the accelerator or shifting, etc., may be used to recognize the driver.

The vehicle may also have a communications unit 8, via which data may be exchanged with other vehicles or with an infrastructure. Communications unit 8 may be developed, for example, to exchange data, for instance, about a traffic light phase or the specified speed with other vehicles or with an external arithmetic unit 10. Data transmission systems such as WLAN or LTE may also be used. In addition, data, such as one's own position, one's own speed may be transmitted via communications unit 8 to other vehicles or to the external arithmetic unit. Moreover, navigation system 7 may store data on the course of roads, slopes, roadway lanes etc., or partially data on the infrastructure, such as traffic lights, traffic signs, etc., in a map data bank. In addition, via the navigation system or via the communications unit one may access external data banks in which, for instance, road data and current data on traffic are available. Furthermore, the vehicle may have its own data memory 9, in which data are able to be stored in the long term As a function of the selected specific embodiment, data memory 9 may also be integrated in the navigation system. Communications unit 8 may also be developed, for example, in the form of a mobile communications unit 8, such as a cell phone, particularly a smart phone, using which, data may be retrieved in a wireless manner, for instance, from the Internet, on current data, such as traffic jams, accidents, construction sites, etc. Output 5 may be developed, for instance, in the form of a display, to output current data, such as traffic jams, accidents and construction sites to the driver.

One idea of the present invention is to provide a method that is able to check the suitability of a driver for using a driver assistance system. By the concept of driver assistance system one may understand every type of function or partial function of the vehicle which supports the driver during the guidance and operation of the vehicle. For example, a driver assistance system may represent a partially or a completely autonomous driving function for guiding the vehicle.

For the decision as to whether the driver is suitable for the utilization of a driver assistance system, the behavior of the driver in the past is taken into account, for example. For this, with the aid of established methods and established parameters, a behavior of a driver in certain driving situations is checked when an active driver assistance system is present.

Examples of semiautonomous driver assistance systems are automatic braking, automatic steering, automatic obstacle avoidance and/or a combination of these functions, up to a fully autonomous guiding of the vehicle.

Figure 2:
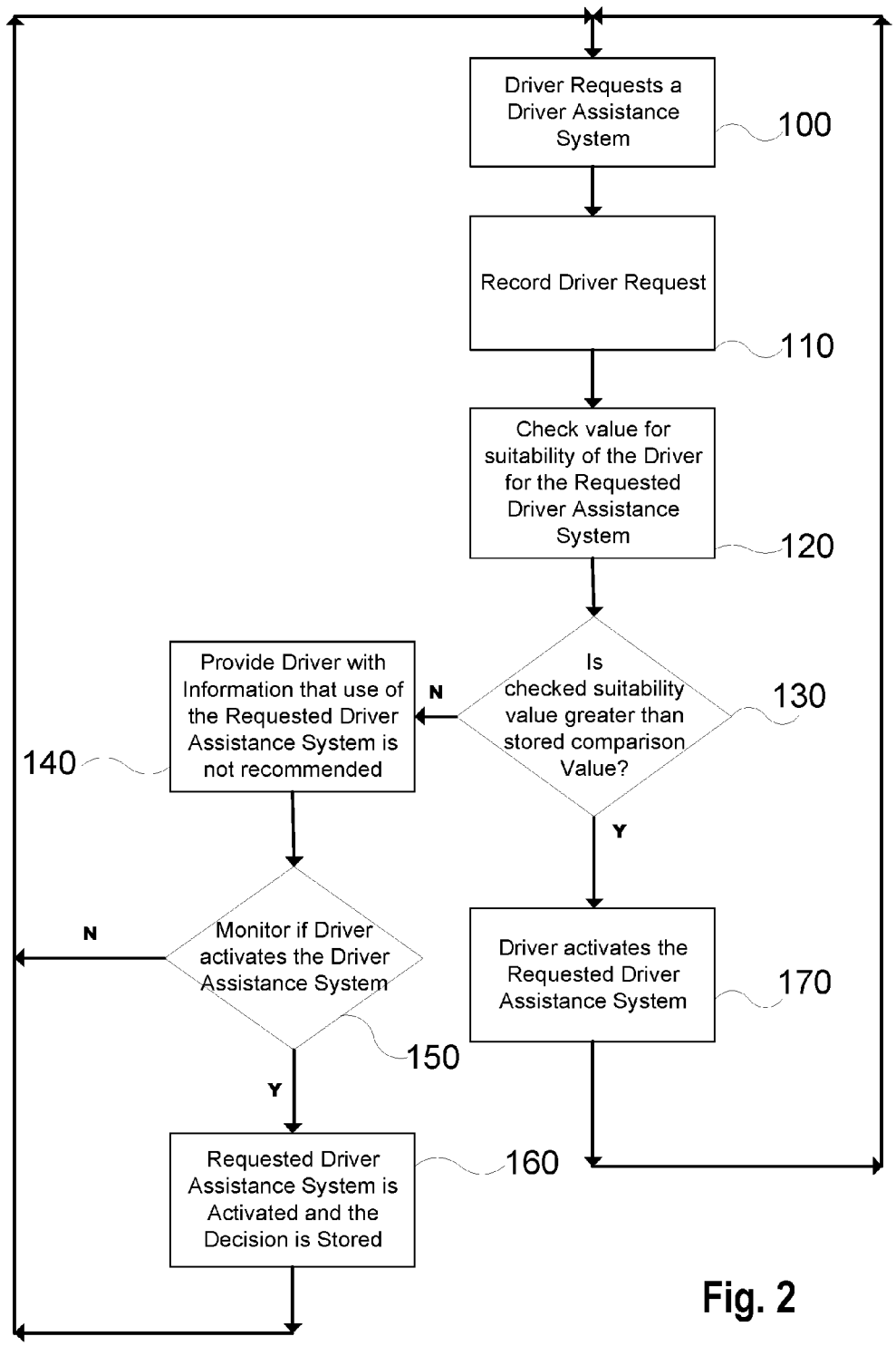
FIG. 2 shows a schematic program sequence for activating a driver assistance system.

FIG. 2 shows a schematic program sequence for carrying out a simple method for activating a driver assistance system. At program point 100, the driver is already driving the vehicle, and would like to activate a certain driver assistance system, such as automatic braking, automatic steering and/or automatic evasion by operating input 4. In a following program point 110, arithmetic unit 2 records the request of the driver wishing to activate a certain driver assistance system. After that, arithmetic unit 2, at the following program point 120, checks whether, for example, there is a value for the suitability of the driver for the selected driver assistance system in data memory 9. At the following program point 130, arithmetic unit 2 compares the present value for the suitability of the driver to a comparison value stored in data memory 9. If the comparison at program point 130 yields that the value of the suitability of the driver is less than the comparison value, branching takes place to program point 140. At program point 140, arithmetic unit 2 gives information to the driver via output 4 that the use of the requested driver assistance system is not recommended. Arithmetic unit 2 then monitors at a following program point 150 whether the driver is nevertheless activating the requested driver assistance system by an appropriate input. If this is the case, then the method branches to program point 160, and the requested driver assistance system is activated. However, after program point 140 if, within a fixed time, the driver does not carry out a renewed activation of the driver assistance system, branching takes place back to program point 100.

At program point 150, if the driver assistance system is activated anew by the driver, in spite of the rejection by arithmetic unit 2, this decision of the driver is stored in memory 9 by arithmetic unit 2.

If the interrogation at program point 130 yields that the stored value of the suitability of the driver for the requested driver assistance system is greater than the comparison value, branching takes place to program point 170. At program point 170, the driver activates the requested driver assistance system. Subsequently, the system branches back to a program point 100.

Depending on the selected specific embodiment, the comparison value used may be a general comparison value, or again it may be a function of the requested driver assistance system and/or of a certain driving situation. The driving situation may include, for instance, travel on an expressway, travel on a country highway, travel in a locality, travel in a traffic jam, travel in established weather conditions, such as rain, fog, snow, daytime travel or nighttime travel. The comparison value may be a function of individual or a plurality of these driving situations named. As a function of the selected specific embodiment, arithmetic unit 2 checks, during the interrogation, which driving situation is present, and uses a comparison value for the comparison which corresponds best to the driving situation. In addition, as the driving situation, one may also take into account the driving time, up to now, of the driver, the fatigue of the driver and/or the attentiveness of the driver.

Depending on the specific embodiment selected, and before the decision by the arithmetic unit 2 that the driving function be activated, i.e. before program point 160 or 170, an additional exclusionary criterion may be checked. For example, certain speed ranges, weather conditions or driving states of the driver, such as increased fatigue, low attentiveness or drunkenness of the driver may be used not to activate the driver assistance system, in spite of the suitability of the driver for the requested driver assistance system. In addition, depending on the specific embodiment selected, when an exclusionary criterion is present, the activation of the requested driver assistance system may not be permitted by arithmetic unit 2. For instance, when it detects a fatigued driver, arithmetic unit 2 is able to prohibit the activation of fully automatic driving of the vehicle. When detecting a corresponding situation, arithmetic unit 2 outputs an alarm signal to the driver.

Figure 3:
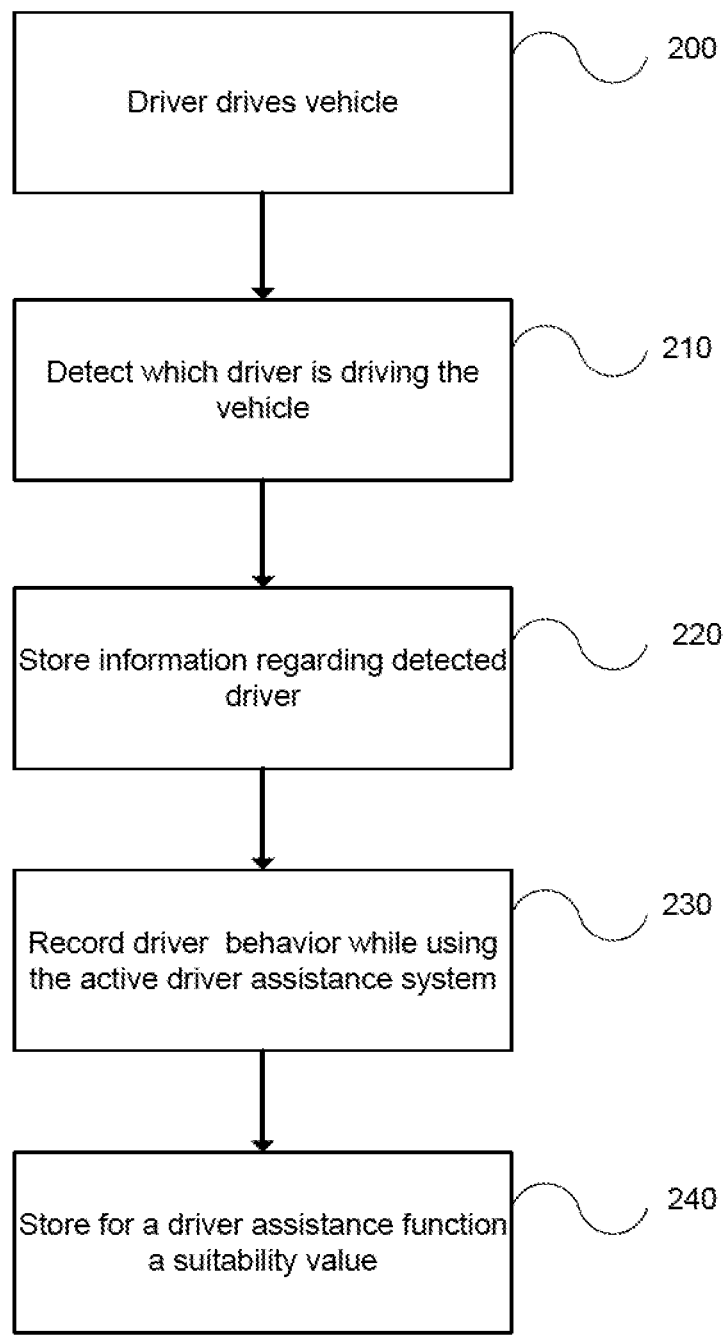
FIG. 3 shows a schematic program sequence for ascertaining a value for the suitability of a driver.

In a schematic representation, FIG. 3 shows a method for ascertaining a value for the suitability of the driver for activating a driver assistance system. At program point 200, a driver drives a vehicle. At the following program point 210, arithmetic unit 2 detects which driver is driving the vehicle. For this, methods such as codes, cameras for recognizing a face or even driving behavior may be used. Arithmetic unit 210 stores the recognized driver in data bank 9 at the following program point 220. Thereafter, arithmetic unit 2 records at the following program point 230 how the driver is behaving while using the active driver assistance system. In this context, the arithmetic unit monitors whether the driver is acting reliably in utilizing the driver assistance system. For this, certain rules and parameters have been stored, using which the assessment of the behavior of the driver, as reliable for the certain driver assistance system, is established. The rules and parameters are able to be established individually for various driver assistance systems. As an example, in an active driver assistance system, automatic ranging is checking whether the driver is falling below the automatically regulated distance from the preceding vehicle by putting his foot on the accelerator, or whether the driver, by his own braking, is increasing the automatically regulated distance from the preceding vehicle. A driver may be graded as unsuitable for the driver assistance system automatic ranging if, during an established time period and/or an established road section he changes the automatically regulated distance in an active manner more frequently than a fixed number. In the simplest case, the driver is able to be valued as unsuitable already when making a one-time change of the automatically regulated distance apart over a road section of 5 km.

Furthermore, a driver may be regarded as unsuitable for the driver assistance system autonomous driving, i.e. automatic steering and automatic braking and automatic lane keeping, if the driver, upon the return of the responsibility to the driver, does not take over the return to guiding the vehicle within a certain time duration.

Depending on the driver assistance system selected, additional or even other parameters may be used for assessing the driver as unsuitable.

At the following program point 240, arithmetic unit 2, for instance, stores for the driving function autonomous driving for driver A the value "unsuitable" in the data bank. The value "unsuitable" may be stored in the form of a 0, for example, and the value "suitable" in the form of a 2. As the comparison value, one might use the value 1 in this example. The stored values are used in the method according to FIG. 2.

Depending on the specific embodiment selected, a suitability value of the driver may be recorded for each driver assistance system. Now, if the driver wishes to activate the corresponding driver assistance system, the recorded value for the suitability is used for the comparison. In addition, for example, for different driver assistance systems, different comparison values are stored. Also depending on the specific embodiment selected, a combination value may be used of the different values for the suitability of the driver for the various driver assistance systems. In this specific embodiment, a combination value is also used for the comparison values of the various driver assistance systems. In this context, the values for the suitability of the driver for the driver assistance systems and/or the comparison values of the driver assistance systems may be weighted differently in calculating an average.

Furthermore, in addition to the requested driver assistance system, additional environmental parameters may be taken into account when averaging the suitability of the driver and/or when selecting the comparison value. In this context, for example, driving on a superhighway, on a country highway or within a town may be valued and be weighted differently. In addition, environmental conditions may be taken into account, such as bad weather, fog, snow, rain when recording the suitability of the driver and/or when selecting the comparison value.

Moreover, the status of the driver may also be taken into consideration in the selection of the comparison value, in order to impede or prevent the activation of a driver assistance system. In addition, as was mentioned before, an exclusivity criterion may be provided for the activation of a driver assistance system, such as increased fatigue of the driver, low attentiveness of the driver, excessively long driving time or drunkenness of the driver, which blocks the activation of a driver assistance system by the driver.

Depending on the specific embodiment selected, the suitability of the driver may be updated currently. This means that, for each driver, standard values are specified for the suitability for the driver assistance systems. During the operation of the vehicle, the values for the suitability for the driver assistance systems may be improved or worsened based on the behavior of the driver.

The data on the suitability of the driver and on the comparison values of the driving functions may be stored in memory 9 of the vehicle and/or in an external data bank which the driver is able to access. For this purpose, a communications unit 8 may be used.

What is claimed is:

1. A method for controlling a driver assistance system in a vehicle, the method comprising:
   recognizing, by a control unit using a sensor, a driver of the vehicle;
   detecting, by the control unit, an activating request for a driver assistance system from the recognized driver;
   ascertaining, by the control unit, a value based on an assessment of a driving behavior of the recognized driver in operating the vehicle while the driver assistance system of the vehicle is in an active state, wherein the driving behavior comprises at least one of a braking operation, an acceleration operation, a shifting operation, an operation modifying a regulated distance, and a failure to retake control of vehicle guidance upon return of responsibility from an automatic function to the driver;
   comparing, by the control unit, the ascertained behavior-based value to a threshold value determined and stored based on rules and parameters established for the driving behavior;
   determining, by the control unit, after the detection of the activating request and based on the comparison, whether the recognized driver of the vehicle is suitable for utilizing the requested driver assistance system; and controlling the requested driver assistance system depending on the determined suitability of the recognized driver for utilizing the requested driver assistance system, wherein the controlling is performed such that:

(i) when the ascertained behavior-based value is greater than the threshold value, the driver is determined to be suitable for utilizing the requested driver assistance system, and the driver assistance system is allowed to be in the active state; and (ii) when the ascertained behavior-based value is not greater than the threshold value, the driver is determined to be unsuitable for utilizing the requested driver assistance system, and the requested driver assistance system is prevented from being in the active state.

2. The method as recited in claim 1, wherein, after the requested driver assistance system is prevented from being in the active state due to the driver being determined to be unsuitable, the driver is able to manually activate the requested driver assistance system by an input.

3. The method as recited in claim 1, wherein different threshold values are stored for different recognized drivers, each respective recognized driver being recognized with an aid of a detection method, and the threshold value associated with the respective recognized driver being used for the comparison.

4. The method as recited in claim 1, wherein the operating behavior of the driver is recorded as a function of a particular driving situation.

5. The method as recited in claim 1, wherein the threshold value varies depending on at least one of (i) a particular driver assistance function, and (ii) a particular driving situation.

6. The method as recited in claim 1, further comprising:
detecting and recording respective operating behaviors of a plurality of drivers, including the recognized driver; and
detecting a new operating behavior, wherein the recognition of the recognized driver is by matching the detected new operating behavior to, out of the detected and recorded operating behaviors of the plurality of drivers, the respective corresponding to the recognized driver.

7. The method as recited in claim 1, wherein, for determining the suitability of the driver, a present driving situation and a corresponding value for the suitability of the driver for the present driving situation is taken into account.

8. The method as recited in claim 1, further comprising executing an algorithm according to which a requested driver assistance function is not activated in consideration of an exclusionary criterion.

9. The method as recited in claim 8, wherein the exclusionary criterion includes at least one of a vehicle speed region and a weather condition.

10. The method as recited in claim 8, wherein the exclusionary criterion includes at least one of a fatigue state of the recognized driver, an attentiveness state of the recognized driver, and a drunkenness state of the recognized driver.

11. The method as recited in claim 1, wherein the suitability determination is based on a previously recorded behavior of the recognized driver.

12. The method as recited in claim 1, wherein the recognized driver is regarded as unsuitable when the recognized driver, upon the return of responsibility from the automatic function to the driver, does not take over the guidance of the vehicle within a certain time duration.

13. A control system for controlling a driver assistance system of a vehicle, the control system comprising:
a sensor;
a control unit, wherein the control unit is configured to recognize a driver of the vehicle based on output of the sensor; and
an input device via which an activating request for a driver assistance system is inputtable by the recognized driver,
wherein the control unit is configured to:
ascertain a value based on an assessment of a driving behavior of the recognized driver in operating the vehicle while the driver assistance system of the vehicle is in an active state, wherein the driving behavior comprises at least one of a braking operation, an acceleration operation, a shifting operation, an operation modifying a regulated distance, and a failure to retake control of vehicle guidance upon return of responsibility from an automatic function to the driver;
compare the ascertained behavior-based value to a threshold value determined and stored based on rules and parameters established for the driving behavior;
determine, after the detection of the activating request and based on the comparison, whether the recognized driver of the vehicle is suitable for utilizing the requested driver assistance system; and
control the requested driver assistance system depending on the determined suitability of the recognized driver for utilizing the requested driver assistance system, the control being such that:
(i) when the ascertained behavior-based value is greater than the threshold value, the driver is determined to be suitable for utilizing the requested driver assistance system, and the driver assistance system is allowed to be in the active state; and
(ii) when the ascertained behavior-based value is not greater than the threshold value, the driver is determined to be unsuitable for utilizing the requested driver assistance system, and the requested driver assistance system is prevented from being in the active state.

14. A non-transitory computer-readable data storage medium storing a computer program having program codes which that are executable by a computer and that, when executed on the computer, cause the computer to perform a method for controlling a driver assistance system in a vehicle, the method comprising:
recognizing, by a control unit using at least a sensor, a driver of the vehicle;
detecting, by the control unit, an activating request for a driver assistance system from the recognized driver;
ascertaining, by the control unit, a value based on an assessment of a driving behavior of the recognized driver in operating the vehicle while the driver assistance system of the vehicle is in an active state, wherein the driving behavior comprises at least one of a braking operation, an acceleration operation, a shifting operation, an operation modifying a regulated distance, and a failure to retake control of vehicle guidance upon return of responsibility from an automatic function to the driver;

comparing, by the control unit, the ascertained behavior-based value to the a threshold value determined and stored based on rules and parameters established for the driving behavior;

determining, by the control unit, after the detection of the activating request and based on the comparison, whether the recognized driver of the vehicle is suitable for utilizing the requested driver assistance system; and controlling the requested driver assistance system depending on the determined suitability of the recognized driver for utilizing the requested driver assistance system, wherein the controlling is performed such that:
(i) when the ascertained behavior-based value is greater than the threshold value, the driver is determined to be suitable for utilizing the requested driver assistance system, and the driver assistance system is allowed to be in the active state; and
(ii) when the ascertained behavior-based value is not greater than the threshold value, the driver is determined to be unsuitable for utilizing the requested driver assistance system, and the requested driver assistance system is prevented from being in the active state.

* * * * *